(12) United States Patent
Young et al.

(10) Patent No.: US 7,343,245 B2
(45) Date of Patent: Mar. 11, 2008

(54) METHOD OF PROCESSING SEISMIC DATA TO EXTRACT AND PORTRAY AVO INFORMATION

(75) Inventors: Roger A. Young, Houston, TX (US); Robert D. LoPiccolo, Spring, TX (US)

(73) Assignee: eSeis, Inc., Houston, TX (US)

( * ) Notice: Subject to any disclaimer, the term of this patent is extended or adjusted under 35 U.S.C. 154(b) by 201 days.

(21) Appl. No.: 11/148,885

(22) Filed: Jun. 9, 2005

(65) Prior Publication Data

US 2006/0282220 A1 Dec. 14, 2006

(51) Int. Cl.
*G01V 1/28* (2006.01)
*G01V 1/00* (2006.01)

(52) U.S. Cl. .......................................... 702/14; 367/47
(58) Field of Classification Search ................ 702/14, 702/1, 11–13; 367/21, 38, 47, 52, 56, 58
See application file for complete search history.

(56) References Cited

U.S. PATENT DOCUMENTS

| | | | | |
|---|---|---|---|---|
| 5,258,960 | A |   | 11/1993 | Swan ........................... 367/38 |
| 5,297,108 | A |   | 3/1994 | Swan ........................... 367/38 |
| 5,440,525 | A | * | 8/1995 | Dey-Sarkar et al. ........... 367/52 |
| 5,515,335 | A |   | 5/1996 | Swan ........................... 367/47 |
| 5,661,697 | A |   | 8/1997 | Swan et al. .................... 367/47 |
| 5,784,334 | A |   | 7/1998 | Sena et al. ..................... 367/47 |
| 6,058,074 | A |   | 5/2000 | Swan et al. .................... 367/38 |
| 6,618,678 | B1 | * | 9/2003 | Van Riel ....................... 702/14 |
| 6,662,112 | B2 | * | 12/2003 | Eastwood et al. ............. 702/14 |
| 6,950,786 | B1 | * | 9/2005 | Sonneland et al. ............ 703/2 |
| 6,952,649 | B2 | * | 10/2005 | Cook et al. .................... 702/14 |
| 6,957,146 | B1 | * | 10/2005 | Taner et al. ................... 702/14 |

OTHER PUBLICATIONS

Young et al., A Comprehensive AVO Classification, Oct. 2003, The Leading Edge.*
Castagna et al., Framework for AVO Gradient and Intercept Interpretation, May-Jun. 1998, GeoPhysics, vol. 63, No. 3, pp. 948-956.*
Russell et al., AVO Classification Using Neural Networks: A Comparison of Two Methods, 2002, CREWES Research Report, vol. 14.*
Young, Roger et al, "*A Comprehensive AVO Classification*", pp. 1-6, Oct. 2003, Houston, Texas.

* cited by examiner

*Primary Examiner*—John Barlow
*Assistant Examiner*—Toan M. Le
(74) *Attorney, Agent, or Firm*—Kenneth L. Nash (57) ABSTRACT

A method of seismic analysis is disclosed for extracting information relating to lithology, porosity, fluids, and AVO types and/or displaying the extracted information. In one possible embodiment, AVO points are plotted and a distance and/or angle is utilized for extracting this information. Various portrayals of the extracted information displays may be produced including displays wherein the extracted information is then displayed in terms of colors for respective x, y, z locations. The AVO points may or may not be normalized based on a shape of a cluster of the AVO points prior to extraction of the information.

25 Claims, 6 Drawing Sheets

METHOD OF PROCESSING SEISMIC DATA TO EXTRACT AND PORTRAY AVO INFORMATION

BACKGROUND OF THE INVENTION

1. Field of the Invention

The present invention relates generally to seismic signal processing and, more particularly, to apparatus and methods for improved interpretation of AVO data from seismic data comprising techniques for obtaining additional information from AVO data to more reliably and consistently detect and/or visualize formations of interest and attributes thereof.

2. Description of the Background

Seismic data is produced in response to a seismic source which generates sound waves that reflect from subsurface formations. The sound waves are detected by a geophone array and recorded. Seismic data is acquired with a geometry that results in the same subsurface points being sampled by numerous source to receiver pairs with different angular relationships. The source to receiver pairs are often described in terms of their offsets with respect to a common midpoint. The processing of seismic data results in, among other things, a gathering of all common midpoint source to receiver pairs. The set of gathered traces may be called the CMP or CDP gathers or, simply the gathers.

Figure 1:
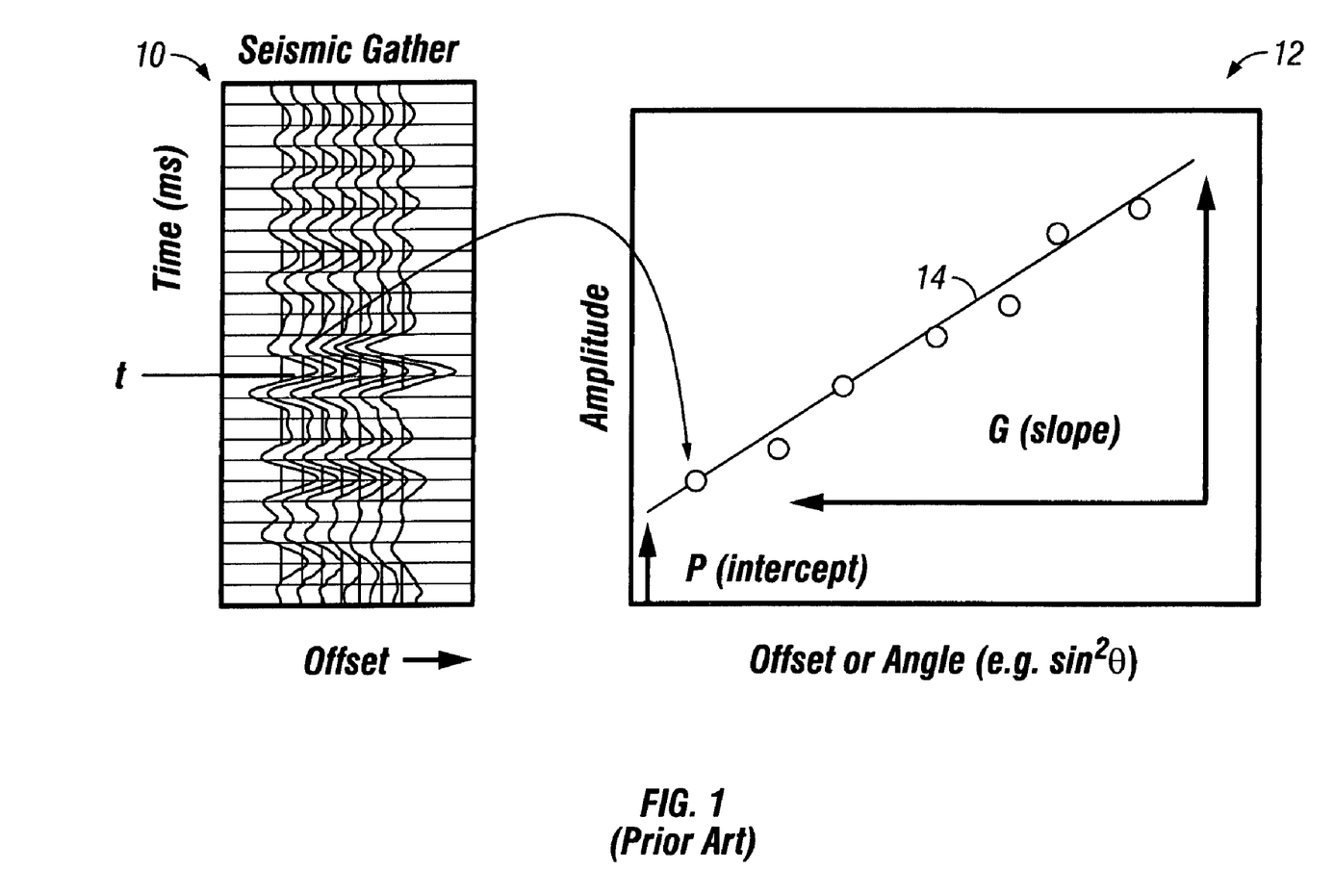
FIG. 1 is a diagram showing typical prior art methods for determining AVO data points.

FIG. 1 shows the process of AVO gradient analysis to obtain AVO data. AVO (amplitude versus offset) analysis is well known in the art of seismic signal processing. Seismic gather 10 is plotted in terms of time versus offset. At any particular time t (or depth), an amplitude versus offset plot can be calculated as indicated at 12. The value of the amplitude of each sample on each trace in the set of gathers is plotted against a measure of the offset of the trace from the CMP (generally the $\sin^2$ or angle of incidence). A best fit line 14 yields a Y-intercept and a slope or gradient (G). It will be understood that other names of the variables involved may be utilized, although P and G are commonly used variable names.

All samples of all CDPs may be analyzed yielding P and G sections or 3-D volumes. In this framework, time and/or depth may be taken to represent a z-axis location, and geographic coordinates represent x and y axes or locations to provide an (x, y, z) framework. It will be understood that x, y, z coordinates can be used to describe 1-D, 2-D, 3-D data volumes, as well as 4-D (sometimes referred to as time-lapse) data. As an example, all the P values may be plotted in a view representative of a section or slice of the Earth. As well, it will be understood that various types of coordinate systems may be utilized so that an (x, y, z) framework, which may effectively be a Cartesian coordinate system, could be transposed into other types of coordinate systems, such as spherical, cylindrical, polar, or the like and are therefore essentially equivalent for purposes of the present invention.

Figure 4A:
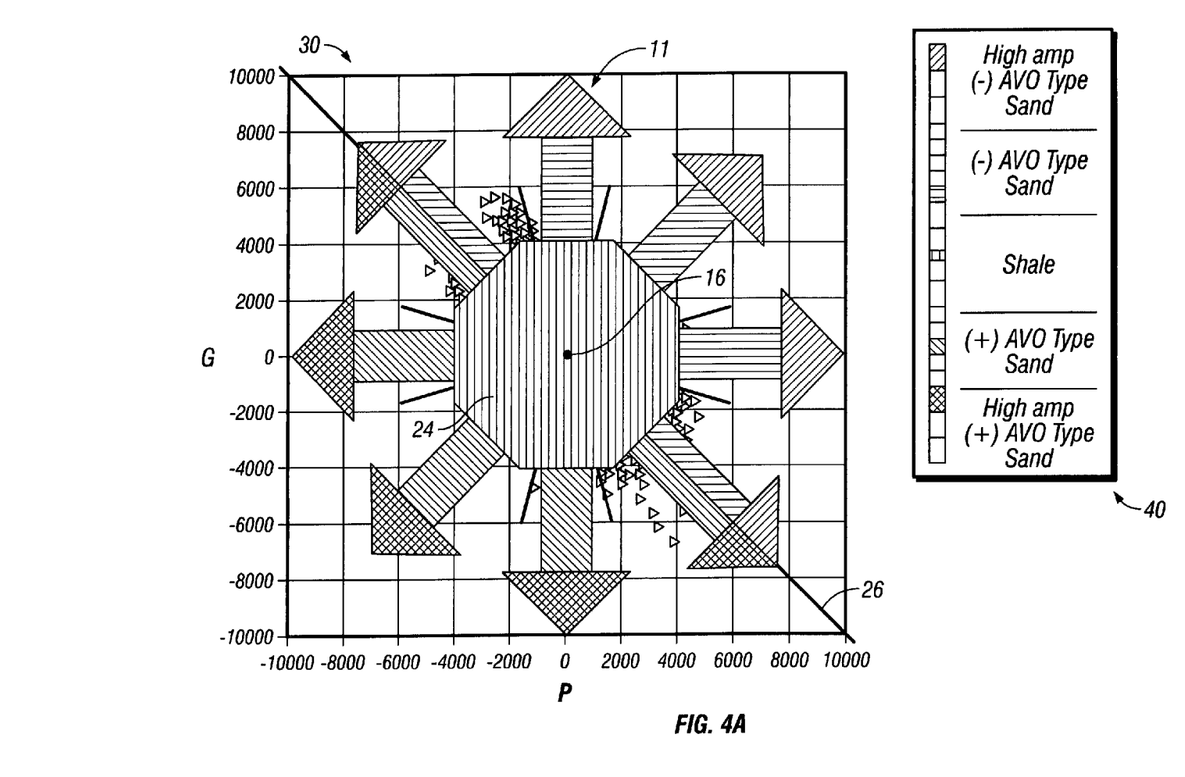
FIG. 4A is a graph of AVO data, which may or may not be normalized as indicated in FIG. 3B, wherein data may be visualized by selecting colors for plotting of the data based on the angle and the distance of the AVO data points with respect to a midpoint in accord with one possible embodiment of the present invention.
Figure 4B:
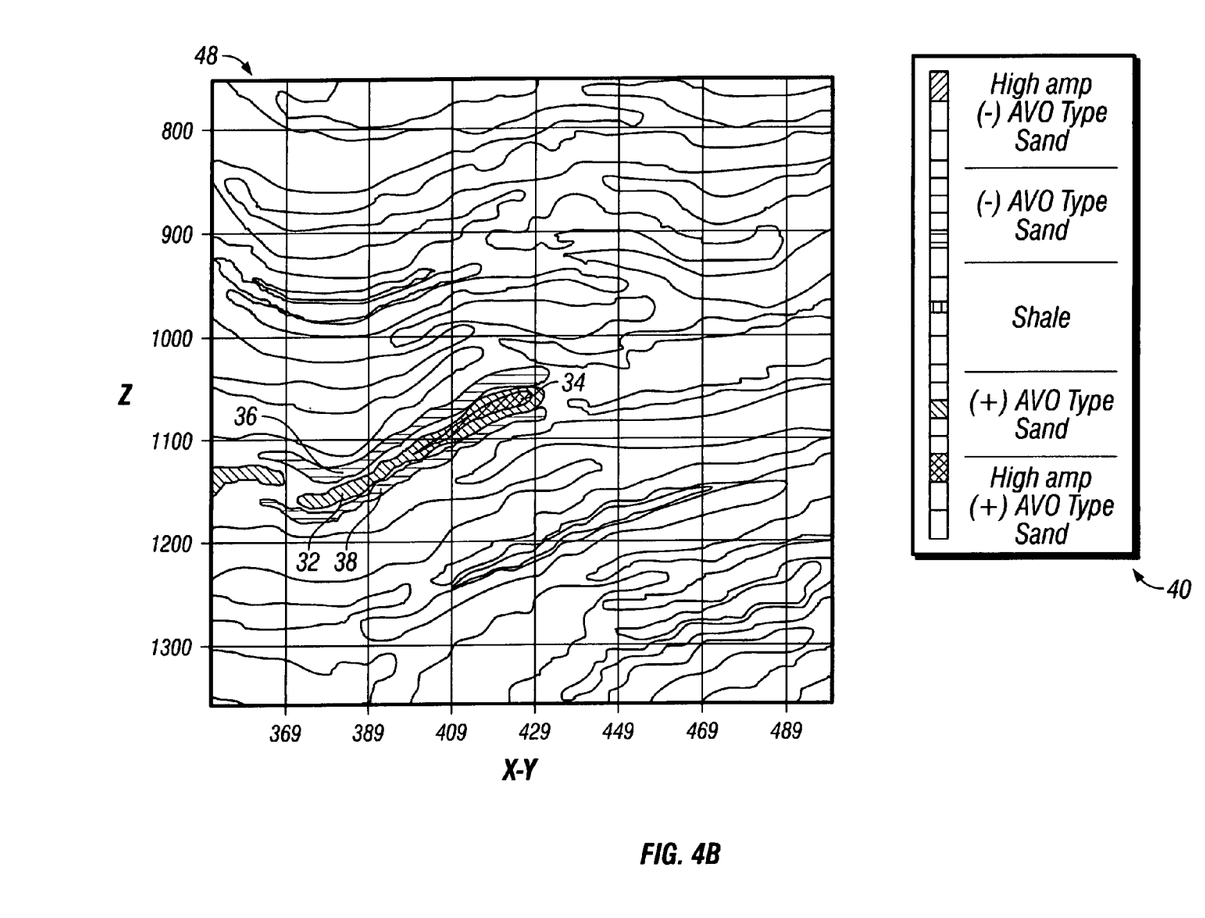
FIG. 4B is an earth section or slice wherein the AVO data as described in FIG. 4B is plotted based on a color scheme in accord with the present invention and wherein for purposes of explanation and clarity within a black and white slice only a selected portion of the graph anticipated to be a zone of interest is crosshatched to indicate a color scheme in accord with one possible embodiment of the present invention.

A representative example of a sectional view of a slice of the Earth in an (x, y, z) framework, although not P values, is shown in FIG. 4B, which is discussed hereinafter. The G values may be plotted in another section or slice of the Earth. A full stack of all values may also be plotted in another section or slice. Looking at these different sections or slices, one of skill of the art may ask where are the sands? Gas? What are the porosities? What types of rocks are these? It may appear that each different section or slice made by plotting these different values seems to give or appear to give a different answer to these questions.

Due the problem of the different possible answers to these relevant questions based on the above described analysis, various efforts have been made to improve the quality of answers obtainable. Some of these efforts are described below in a listing of background U.S. Patents. One prior art method is shown in U.S. Pat. No. 5,440,525, which is also discussed below. In this approach, the AVO data is plotted as discussed above, and a background trend line is determined. The distance from the background trend line is then considered to provide an indication of hydrocarbons. However, the results of this technique can overlook what are considered by the inventors to be significant information that may result in overlooking important pay zones.

U.S. Pat. No. 5,297,108, issued to Swan on Mar. 22, 1994, entitled "Seismic Velocity Estimation Method," and U.S. Pat. No. 5,258,960, issued to Swan on Nov. 2, 1993, entitled "Seismic Velocity Estimation Method", disclose a method for detecting errors in estimated seismic velocities used in a normal moveout correction of a gather of traces selected from conventional, common midpoint seismic data. Zero offset reflectivity and amplitude versus offset slope traces are derived from the NMO corrected gather. Analytic traces are calculated for the zero offset reflectivity and amplitude versus offset slope traces. The analytic zero offset reflectivity trace is multiplied by the complex conjugate of the analytic slope trace and the imaginary part of the product indicates estimated velocity errors. The velocity error indicator is used to correct the velocity estimates so that the normal moveout process may be reperformed without the errors caused by incorrect velocity estimates. Alternatively, the velocity error indicator itself is plotted on a seismic section as an indicator of characteristics of subsurface earth formations.

U.S. Pat. No. 5,440,525, issued to Dey-Sarkar et al on Aug. 8, 1995, entitled "Seismic Data Hydrocarbon Indicator," discloses a method for displaying seismic data to provide direct indications of the presence of hydrocarbons. Seismic data is processed using conventional amplitude versus offset techniques to obtain zero offset reflectivity, or A, traces and the amplitude versus offset slope, or B, traces. AB cross plots of each trace are then generated. Each sample point on the cross plot is then assigned a value corresponding to its deviation from the regression line of the cross plotted AB points. The assigned values are then plotted in their corresponding time sample positions to generate a trace or display providing a direct indication of hydrocarbons.

U.S. Pat. No. 5,515,335, issued to Swan on May 7, 1996, entitled "Seismic Trace Overburden Correction Method", discloses a method for generating improved displays of seismic data by processing seismic amplitude versus offset data to correct for overburden effects. Analytic traces are calculated for the zero offset reflectivity, A, trace and the amplitude versus offset slope, B, trace of the AVO data. Statistics for the A and B traces within a selected window in time and common depth point space about a selected sample point are calculated. The statistics include root mean square amplitudes of the A and B traces and the correlation coefficient. Desired statistics are selected and used with the measured statistics to correct the A and B traces.

U.S. Pat. No. 5,661,697, issued to Swan et al on Aug. 26, 1997, entitled "Method and Apparatus for Detection of Sand Formations in Amplitude-Versus-Offset Seismic Surveys", discloses a method and apparatus for analyzing amplitude-versus-offset (AVO) seismic data to distinguish sand formations, such as Morrow sands, from limestones and other similar intervals. For each of the traces in the survey, AVO intercept and AVO slope traces are generated, preferably after normalization of the amplitudes of the traces to account for geophone coupling variations. After normalization and conventional processing and corrections, spatial summation may be performed to further improve the traces. AVO trend lines are then generated, preferably on a weighted window basis, to generate localized trend lines against which the intercept and slope values of individual depth points may be compared. This comparison allows the plotting of AVO intercept versus AVO slope deviation from the trend line, from which sand formation interfaces may be identified by their presence in certain quadrants of the intercept-slope deviation cross-plot.

U.S. Pat. No. 5,784,334, issued to Sena et al on Jul. 21, 1998, entitled "Method and System for Detecting Hydrocarbon Reservoirs Using Amplitude Versus Offset Analysis of Seismic Signals", discloses a computer-operated method for analyzing seismic data to discern the presence of hydrocarbon-bearing formations. According to the disclosed method and system, amplitude-versus-offset (AVO) analysis is performed to assign, for each depth point in a survey region, an AVO intercept value and an AVO gradient value; the AVO intercept value corresponds to the zero-offset response for acoustic reflections from the depth point, while the AVO gradient value corresponds to the rate of change of the amplitude as a function of the angle of incidence of the acoustic energy (typically, with the square of the sine of the angle). An AVO indicator indicative of the presence of hydrocarbons at a subsurface stratum is derived to correspond to the rate of change of the product of the AVO intercept value and the AVO gradient value for the depth point under analysis, along the direction of a deviation vector of the AVO intercept value and the AVO gradient value from a background trend for depth points surrounding the depth point under analysis in time and space. The background trend, and thus the deviations, may be a straight line in a space having AVO intercept value and AVO gradient value as axes, or may be a statistical trend used in deriving the deviations. Use of the disclosed method and system has been observed to indicate deep hydrocarbon-bearing formations that are not detectable using conventional AVO analysis.

U.S. Pat. No. 6,058,074, issued to Swan et al on May 2, 2000, entitled "Method and System for Detecting Hydrocarbon Reservoirs Using Amplitude-Versus-Offset Analysis with Improved Measurement of Background Statistics", discloses a computer system and method of operating the same to apply overburden corrections to seismic signals prior to amplitude-versus-offset (AVO) analysis. The system and method retrieve common midpoint gathers of the seismic signals, and generate analytical, or complex, AVO intercept and AVO slope traces therefrom, effectively stacking the traces in each gather. Over a sliding time window of the stacks, the computer system generates p-measure standard deviation and correlation statistics, preferably using a p-measure value less than one. The AVO intercept and AVO slope traces are then modified, at each depth point of interest corresponding to a time window placement, according to the relationship between the p-measure statistics and the desired statistics for the background distribution. Conformance of the background statistics to known values can be achieved, thus eliminating offset-dependent contamination of the AVO data; this is accomplished with minimal influence from AVO anomalous points, improving the sensitivity and accuracy with which petrophysically-interesting strata may be detected from AVO traces.

The article "A Comprehensive AVO Classification," by the present inventors, was published October 2003, and discloses an AVO classification wherein all possible combinations of normal-incidence reflectivity and offset-dependent reflectivity, for all seismic energy coming from the top of nonshale lithologies, are subdivided into 10 types. Broadly, the divisions result from dividing a unit circle into eight domains depending on the attributes of P and G: They each may be positive, near zero, or negative, independently of the other. Two of the domains are further subdivided and all of the domains are grouped by a further distinction as to whether the types are: conforming, where decreasing shaliness and increasing gas have similar effects: or, nonconforming, where decreasing shaliness and increasing gas have opposite effects (or gas has no effect). The definitions are divorced from a gas-sand association and applied, without discrimination, to any nonshale lithology. This approach also departs from conventional AVO analyses in that the AVO attribute becomes a continuously distributed attribute of the seismic data.

The above cited art does not overcome the disadvantages discussed hereinbefore. Consequently, there remains a long felt need for improved methods of seismic signal analysis for more accurately locating formations of interest. Those skilled in the art have long sought and will appreciate the present invention which addresses these and other problems.

SUMMARY OF THE INVENTION

It is an object of the present invention to provide an improved seismic analysis method which may be applied to 1-D, 2-D, 3-D, or 4-D data.

It is yet another object of the present invention to provide an improved method for classifying and/or displaying AVO data.

These and other objects, features, and advantages of the present invention will become apparent from the drawings, the descriptions given herein, and the appended claims. However, it will be understood that above-listed objectives and/or advantages of the invention are intended only as an aid in quickly understanding aspects of the invention, are not intended to limit the invention in any way, and therefore do not form a comprehensive or restrictive list of objectives, and/or features, and/or advantages.

The present invention comprises a method for analyzing seismic data. The method may comprise one or more steps such as, for instance, a step of obtaining seismic data produced in response to acoustic signals transmitted through the earth. Additional steps may comprise utilizing gathers from the seismic data for producing AVO information which may comprise a plurality of AVO data points wherein each of the AVO data points may be related to an (x, y, z) location. In one possible embodiment, the method may further comprise determining a reference location which may or may not be positioned amongst the plurality of AVO data points. If desired, the method may further comprise utilizing a distance with respect to the reference location to differentiate, classify, detect, or the like, properties associated with the AVO data points (and each associated x, y, z position) such as at least one of lithology or fluids or porosity or AVO types. In addition or as another possible alternative, the method may be utilized to portray extracted information such as lithology or fluids or porosity or AVO types with respect to their (x, y, z) location.

The method may further comprise utilizing an angle of the one or more AVO data points with respect to the reference location in conjunction with the distance for classifying the one or more AVO data points with respect to at least one of lithology or fluids or porosity AVO types.

The method may also comprise determining an angle from the reference location wherein the distance along a direction of the angle is substantially correlated with a continuous change of porosity. In this embodiment, a crossplot of the AVO data points may be utilized such that the angle of interest for differentiating porosity associated with the AVO points is approximately forty-five degrees from the vertical.

In one possible embodiment of the invention, one or more steps may comprise normalizing a cluster of AVO points around the reference location by varying the distance of each of the plurality of AVO points. If desired, the method may comprise designating a cluster of points around the reference location as a selected lithology and designating AVO points outside of the cluster of points as not being the selected lithology. As one possible example, if the cluster of points is designated as shales then points outside the cluster of points may be designated as non-shales. Points in the border regions may be designated as shaley sands.

In one embodiment, the normalization of AVO points may effectively alter a shape of a selected cluster of the plurality of AVO data points by applying a normalizing factor to the plurality of AVO data points wherein the normalizing factor may be related to the shape of a selected cluster. After normalization, the shape of the selected cluster will be changed to a desired shape. If desired, the normalizing factor may then be applied to the distance with respect to the reference location among the AVO data points for determining one or more properties such as lithology, fluids, porosity, or AVO types. In one embodiment, the normalization factor does not affect an angle of the plurality of AVO data points with respect to the reference location.

Another embodiment of the invention may comprise portraying (x, y, z) locations, such as a slice of the Earth, in terms of extracted information related to at least one of lithology or fluids or porosity or AVO types.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DETAILED DESCRIPTION OF THE PREFERRED EMBODIMENTS

Figure 2:
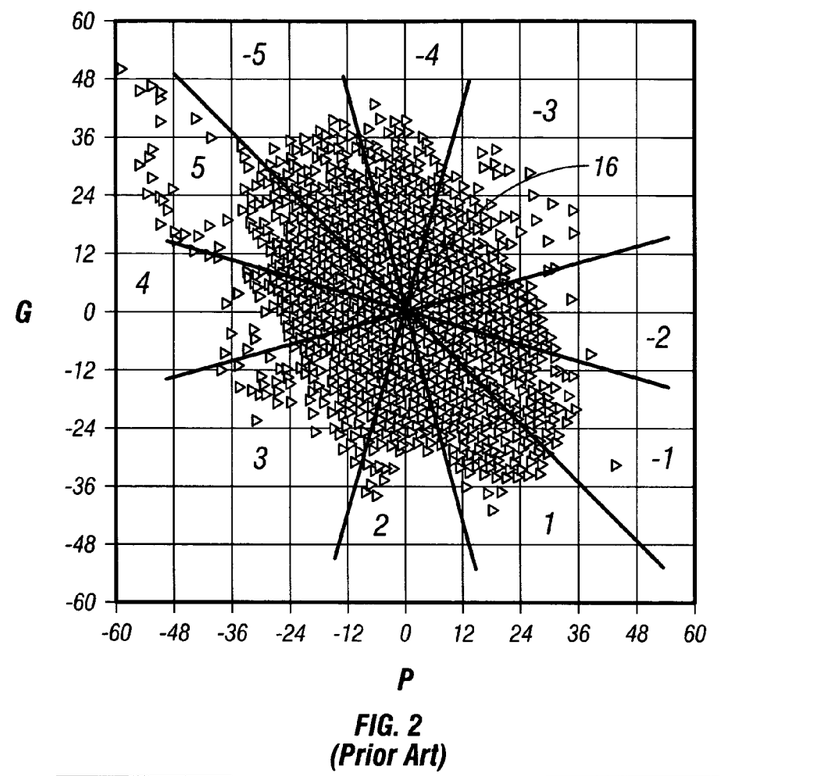
FIG. 2 is a plot of AVO data which may be obtained utilizing the prior art methods shown in FIG. 1 whereupon AVO types are defined.

Referring now to the FIGS., and more particularly to FIG. 2, there is shown a typical plot of P and G points as may be obtained from seismic gather 10. FIG. 4A shows the same plot of P and G points but with lithology/fluid differentiator or color scale 11 imposed on the plot of P and G points. Lithology/fluid differentiator or color scale 11 is discussed subsequently.

In the example of FIG. 2, the plot of P and G points is divided into AVO types. A more detailed discussion as to the division of the plot of points into AVO types is disclosed in the article "A Comprehensive AVO Classification" written by the inventors. The AVO types may be defined in terms of a range of angles into which each point in the graph falls. In this example, the AVO types range from −5 to 5. The AVO ranges are selected so as to be consistent with previously utilized AVO types so as to provide easier comparison with earlier AVO interpretation data but other ranges or angles could be utilized for the AVO types. For purpose of the present invention, the AVO type may be considered as a rock property.

Referring now to FIG. 4A, and in accord with one preferred embodiment of the present invention, P and G or AVO data points may be defined by their distance from a reference point 16 such as the origin of the plot of points or a selected or imposed central point within the cluster of points. Reference point 16 will be preferably centrally located within the most dense cluster of AVO data points generally designated here as 24. Reference point 16 may typically be the origin of the plot. However, reference point 16 could be calculated as being the center of a cluster of points AVO points using various calculations or statistical analysis for locating the central position of a group of points (e.g., centroid calculations, center of gravity calculations for a selected centrally located group of AVO points, or other suitable calculations). For a large number of AVO points, reference point 16 may typically be in the center or substantially in a center position among the AVO points if the plot is symmetrically indexed. However, if a small number of AVO points are utilized, or if particular AVO points are selected, then it is possible that reference point 16 may not be in the center of the AVO points. While the term central or reference point is utilized herein it will be understood that a central or reference region or the like may also be used herein in the same manner or essentially equivalent manner and, if desired, may be used as discussed hereinafter for classifying AVO points and/or to produce a potential error analysis or portrayal or the like. Generically, reference point 16 may therefore also be considered a reference location.

The distance from reference point 16 to a non-normalized or normalized (as discussed hereinafter) AVO point such as particular non-normalized or normalized P and G point could be referred to as a radius if radial coordinates are utilized rather than Cartesian coordinates. For convenience, the term radius may also be used herein as the distance from reference point 16 to a P and G point even though the plot may be based on Cartesian or radial coordinates or any desired coordinate system. For purposes of the present invention, the radius or distance from the reference point 16 to any particular point is itself considered another rock property. The radius may also be referred to as the lithologic/fluid contrast or differentiator upon which color scale 11 may preferably be at least partially based.

Classifying AVO points utilizing the radius from reference point 16 and an angle from reference point 16, in accord with the present invention, may provide significant lithographic/fluid information with respect to any and all AVO data in graph 30 thereby overcoming shortcomings in prior art AVO analysis techniques alluded to hereinbefore wherein certain AVO points are disregarded and/or AVO points are not always thoroughly classified with respect to potential associated properties such as lithology, fluids, porosity, and/or AVO types.

While the techniques herein may be utilized in the abstract to filter and/or detect and/or locate subsurface formations of interest out of large masses of data via computer processing, the techniques of the present invention may also be utilized for portraying and/or visualizing sections of earth or slices as discussed hereinbelow.

Figure 5A:
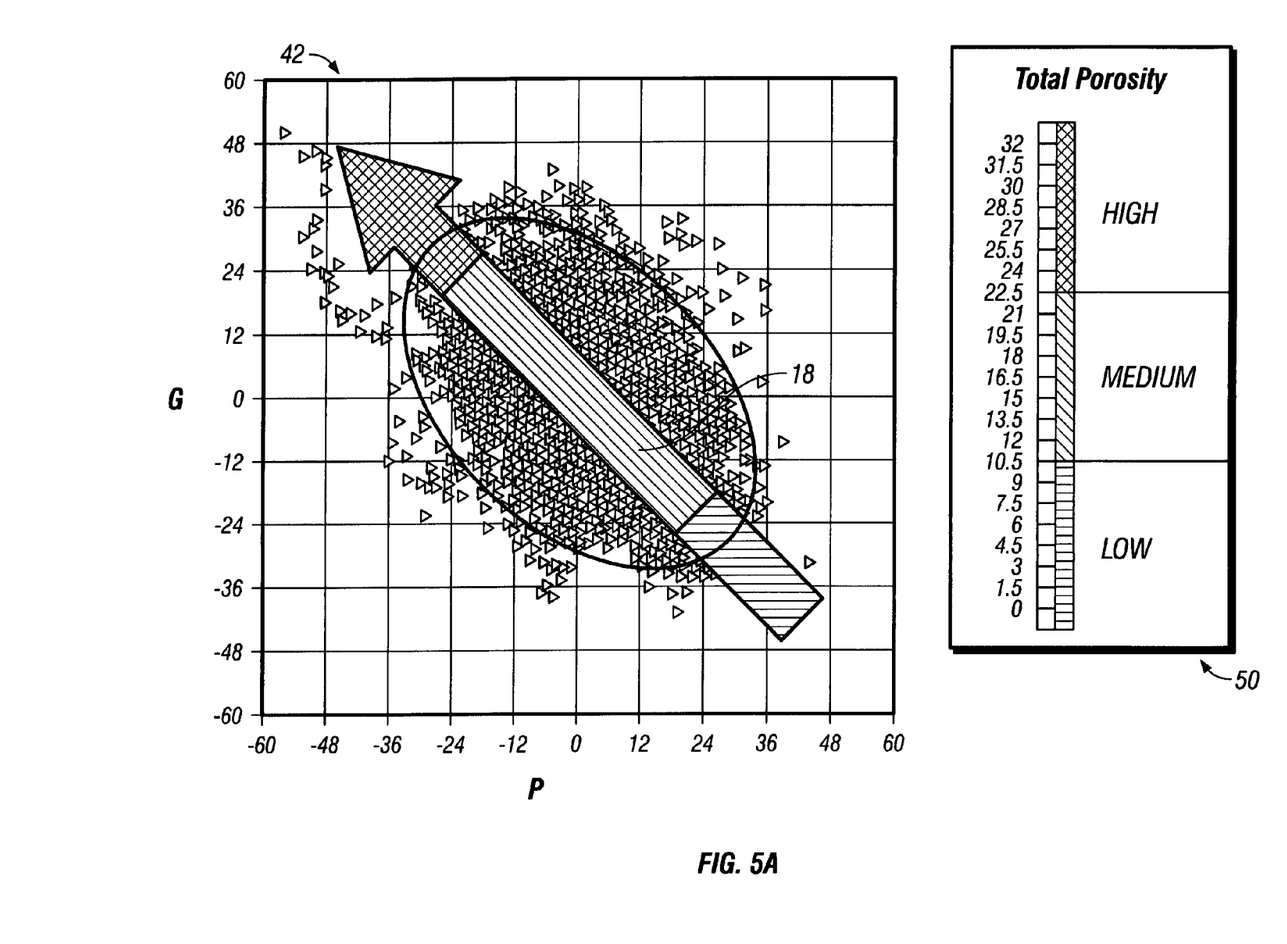
FIG. 5A is a graph of AVO data, wherein data may be visualized in terms of porosity by selecting colors for plotting of the data based on the position of the AVO data point with respect along a scale from the bottom right to the top left of the graph in accord with one possible embodiment of the present invention.

Referring now to another important property of formations, a discussion is now made of porosity or pore space as related to the present invention. It will be understood that greater pore space permits storage of greater amounts of fluids such as valuable hydrocarbons. Gases also require at least some porosity in the formation. Referring now to FIG. 5A, arrow 18 is imposed on the plot. Generally, vector or arrow 18 may be at an angle of forty-five degrees, depending on the symmetry of the scale of plot 42, and may be shown generally going through a central portion of plot 42. Essentially, and more precisely, arrow 18 goes in the direction of what is considered to be an increase in porosity for AVO points within plot 42. Generally vector 18 will be substantially parallel to an axis of a generally elliptical shape of the cluster of AVO data, as shown by ellipse 20 in FIG. 3A. Thus, at the bottom right of graph 42 where P is relatively high and G is relatively low, the porosity is considered to be low. At the top left of graph 42 where P is relatively low and G is relatively high, the porosity is considered high. If the P and G data were plotted in a different way, arrow 18 may be plotted and angled accordingly. The relative position of AVO data points with respect to arrow 18 is utilized to differentiate the porosity associated with those data points. The entire plot 42 could be covered with arrow 18 or a similar differentiator to thereby indicate that every AVO point can be classified with respect to porosity. However for sake of what is believed to be a more easily understood example, arrow 18 is illustrated is as shown. Accordingly, the present invention provides that along with lithology and fluids, a porosity of all or any AVO points and their associated x, y, z position may be detected by use of computer processing and, if desired, displayed as discussed hereinafter.

Figure 3A:
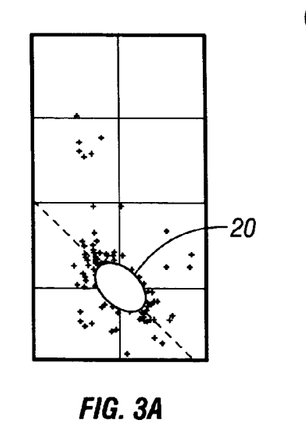
FIG. 3A is a plot of AVO data, such as the data shown in FIG. 2, wherein it is shown that data surrounding the origin point may typically cluster within a generally elliptical geometry.

It will be observed in the graph of FIG. 2 and FIG. 3A, that the points tend to cluster in a generally elliptical shape.

Generally, there is a dependency between P and G so that the data will typically plot as an ellipse. In one possible embodiment of the present invention, a normalization routine is utilized to account for this dependency.

FIG. 3A shows generally elliptically shaped cluster 20 of AVO data to illustrate the typically elliptical shape of P and G data prior to being normalized. While normalization could be accomplished in many ways, in a preferred embodiment of normalization, it may be desirable to maintain the angular relationships and normalize only the radial relationships by adjusting the radius. While normalization may or may not be utilized in accord with the invention, if normalization is used, then the P and G data may be analyzed after normalization, for AVO type, lithologic/fluid contrast, and porosity. Although preferably applied to all P and G points, normalization will affect the graph of the P and G points by causing the shape of the cluster of P and G data points shown at 20 to expand outwardly until the cluster is round or generally rounded as indicated at 22 in FIG. 3B. Therefore, AVO points to the side of cluster 20 are more affected by normalization than other points. As a general goal, after normalization, the average distance of the P and G cluster of points from reference point 16 will now be approximately equal in any direction for purposes of processing the AVO data. In other words, the cluster of AVO data points 20 will now be substantially rounded as indicated at 22. The points that were originally outside of approximate ellipse 20 will now be outside of approximate circle 22.

Although various formulas may be used to program a computer to perform normalization, one presently preferred formula is to multiply the radius (or distance from reference point 16 to each P and G point as originally plotted) of each P and G point by a factor derived from applying the formula $\frac{1}{2}\sqrt{P^2+G^2}$ to all points within a selected number of AVO points and taking the average. In one embodiment, this formula would be applied to the half of the data which has the lowest combined values for P and G collectively. For instance, in FIG. 3A, the normalization factor would be determined by applying the formula to the AVO points within ellipse 20. The general effect is that if the normalization factor is applied, the average distance of AVO points in all directions from reference point 16 will be approximately equal, at least for the selected cluster of points around reference point 16 which may comprise fifty percent or more of the AVO points. The normalization factor is then intended to be applied to all points before utilizing the radius and angle as described earlier for determining lithology, fluids, porosity, and/or AVO types. However, it will be understood that other averaging methods or formulas may be utilized to achieve the goals as described herein of essentially compensating for dependency between P and G points. The overall shape of ellipse 20 may vary from one set of data to another so that the value $\frac{1}{2}\sqrt{P^2+G^2}$ may vary from batch to batch. If different coordinate systems are utilized, then the normalization factor will also vary.

In accordance with some possible initial steps in the present invention, P and G values are computed for each sample, e.g. at each depth or time sample. If desired, a plot of P and G may be plotted linearly with respect to time or depth (not shown), e.g., the value of P and the value of G as it varies with depth. The P and G values may also be cross-plotted as shown in FIG. 2. If desired, the different sections of the AVO data may then be subdivided into AVO types and then colored wherein each different AVO type may have a different color.

If desired, a view of seismic traces, such as those shown in seismic gather 10, may be colored (not shown) whereby the angular direction of the data points from reference point 16 defines the color the seismic trace inherits for each computed time or depth sample. In another preferred embodiment, a seismic section is shown in terms of AVO types. If desired, only the data points associated with non-shale lithologies are colored.

Figure 3B:
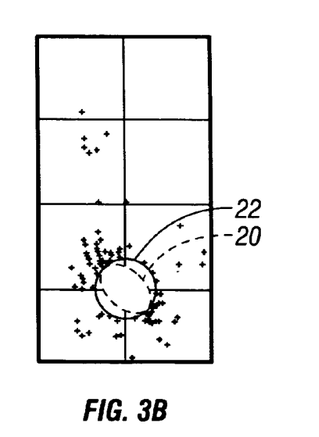
FIG. 3B is a plot of AVO data, such as the data shown in FIG. 3A, wherein in one possible embodiment of the present invention the AVO data is normalized.

The present invention provides a useful method for determining non-shale lithologies and distinguishing non-shale lithologies from shale lithologies. Referring to FIG. 3A and FIG. 3B, the grouping of data points within a selected size ellipse 20 or a selected size circle 22 is designated as being shale lithology because for many fields, in the general range of depths of interest, shale may be the most predominant lithology. As well, these data points are usually characterized by low reflectivity and therefore associated with a shale lithology. The selected size ellipse 20 or selected size circle 22 may be defined to include points up to a selected percentile of points in any particular direction. For instance, ellipse 20 or circle 22 may include 50% of the data points. The particular percentage may vary as desired and may be selected based on knowledge of the field, core samples, or other information if known. However, generally a value of from 40% to 60% may often be utilized without other knowledge or as a starting point for analysis. Points which are outside of ellipse 20 or circle 22 may then designated non-shales and may include sands, limestones, are other formations. As is discussed subsequently, AVO data adjacent or within outer edges of ellipse 20 or circle 22 may be designated as shaley sands and so visualized. Thus, the present invention comprises a useful technique for distinguishing shales from non-shales. This may be helpful for displaying prior art data. For instance, in accord with the present invention, it is now possible to produce a sectional view or slice of the earth which shows AVO types that are only non-shales, thereby allowing the user to focus on sands or other non-shale formations of interest.

While in the above discussed embodiment of the invention, the centrally located AVO data is designated as shales, it will be understood that the centrally located data points may represent other types of formations where applicable to the field of interest, e.g., non-shales.

It may also be desirable, in accord with the present invention, to produce a sectional view or slice of the earth which shows lithology and fluids within the lithology. If desired, it may also be desirable to color traces in a gather related to time or depth samples utilizing a color scheme in accord with the present invention. Referring to FIG. 4A, the present invention provides means for coloring data to represent this. Data points further away from reference point 16 than a desired percentile e.g., greater than 50% of the points (either 50% of the total number of points or 50% of the points in a desired direction or section), may be designated and colored as being not shales. If desired, shales may not be included or may be invisible to improve clarity and decrease clutter. Central region 24 shown in FIG. 4A might be selected as non-shales. Although central region 24 is shown as octagonal rather than circular or elliptical, if desired this region or other shapes for central regions could be utilized and designated as non-shales. As discussed hereinafter, portions of region 24, such as border regions, may be designated as variations of shales and non-shales, e.g. shaly sands, sandy shales. In any case, it should be understood that central region 24 may also be the same as central clusters 20 or 22 shown in FIG. 3A or FIG. 3B.

In many fields, non-shales may be considered sands which may appropriately be colored yellow. It may be desirable to distinguish sands depending on the direction the points fall with respect to reference point 16. In FIG. 4A for instance, all sands to the left of line 26 might be colored yellow. In this example, line 26 is at 45° and extends through reference point 16 but could be oriented differently depending on the scale of graph 30. Therefore all AVO data in the lower left half of graph 30, and outside of central region 24, may be considered sands which might potentially be colored yellow or grades of yellow depending on the radius of the data point. It will be noted that these points also make up the positive AVO types. However, points in this region and positioned at a large radius from reference point 16 might be colored red because this is might be considered an indication of gas. Points above line 26, and outside of central region 24, might be considered sands but may be colored gray. These points are negative AVO type sands. In this same upper right region, points with an extreme radius might be colored dark blue.

Thus, the scale or color template 11 may be utilized following the procedures discussed in the preceding paragraph. When this color template is applied to the data points and used to color the corresponding slice or earth section which is viewed, the result may be as shown in FIG. 4B. To avoid confusion where crosshatching is used instead of colors as per FIG. 4B, only a portion of the slice is crosshatched. This portion shows a sand 32 wherein it appears that a gas pay zone 34 may be found. If color were used, sand 32 would then be yellow and gas pay zone 34 would be red. Upper sand 36 and lower sand 38 would be gray because the sands are negative AVO types. It will therefore be understood when looking at scale or color template 11 that all points in the graph will now have a designated color which corresponds to scale or color template 11. Moreover, scale or color template 11 may have more colors or shades of colors to indicate variations as suggested by color bar 40 wherein the blank portions between the crosshatched portions may be different shades of a particular color. For instance, designated shale points could be dark green when they are within region 24 but relatively close to reference point 16. Designated shale points could be light green when they are within region 24 but relatively far from reference point 16. Light green points might indicate the possibility of sandy shales. Likewise, the sands may be broken up into different shades of yellow or perhaps brown whereby brown may indicate shaley sands. In summary, a seismic section such as that shown in FIG. 4B may be produced in accord with the present invention which describes and permits easy visualization of the rock properties including lithology and fluids. Moreover the analysis of the present invention is more comprehensive than prior art methods in that all AVO data points may be utilized and may be accordingly classified, differentiated and portrayed according to the extracted information such as the properties of lithology, fluid, porosity, and AVO type.

Figure 5B:
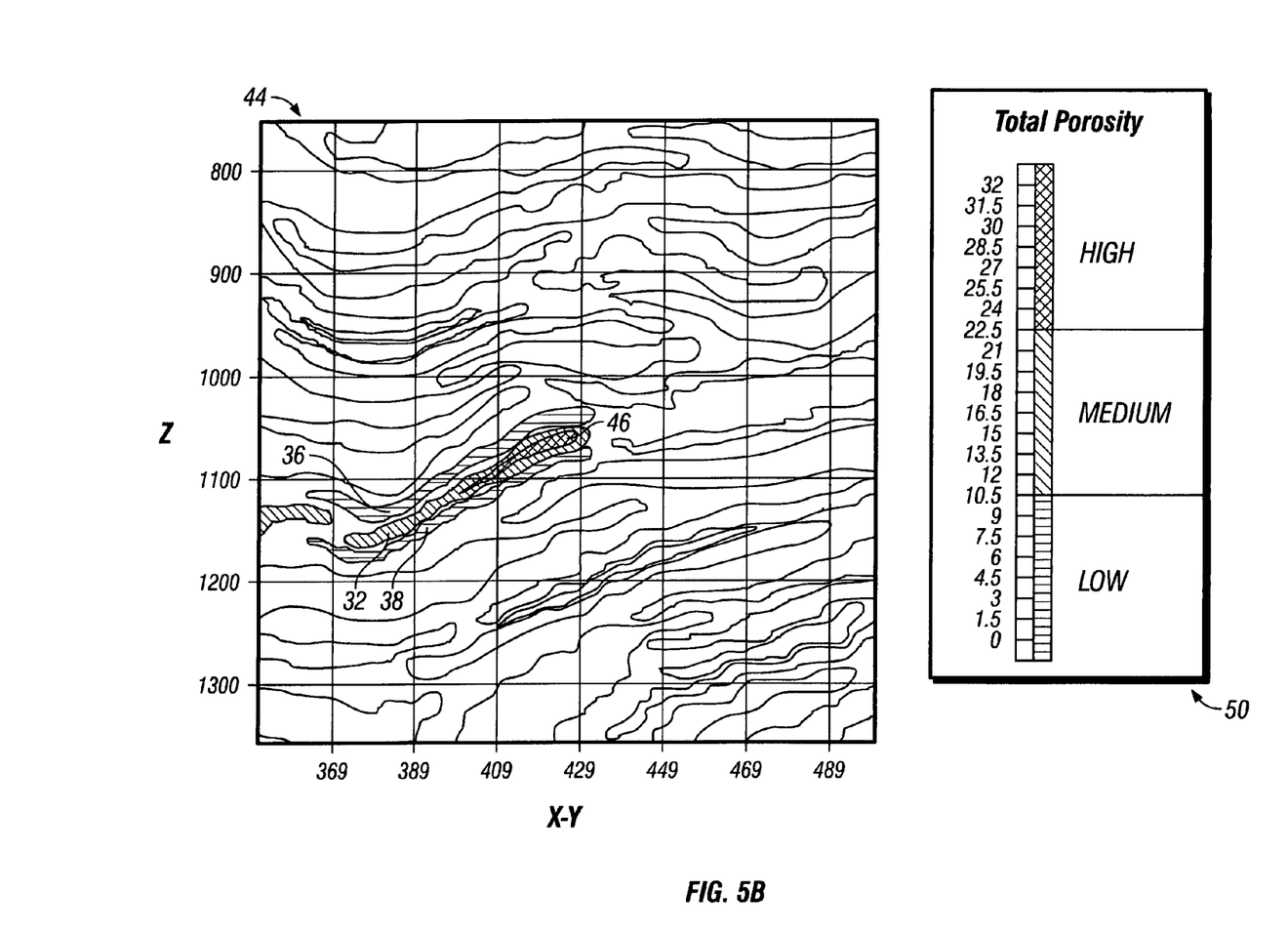
FIG. 5B is an earth section or slice wherein the AVO data as described in FIG. 5B is plotted based on a color scheme in accord with the present invention which indicates porosity and wherein for purposes of explanation and clarity within a black and white slice only a selected portion of the graph anticipated to be a zone of interest is accordingly crosshatched to indicate a porosity color scheme in accord with one possible embodiment of the present invention.

Color template arrow 18 may be utilized for describing porosity by scaling the range from the top left corner of graph 42 in FIG. 5A to the bottom right corner. Although template arrow 18 is shown with a width that is relatively narrow for visualizing purposes, effectively template arrow 18 covers the entire graph so that porosity at all points in graph 42 can be determined. The coloring so produced may be used to color gathers or sectional views such as sectional view 44 of FIG. 5B. Another variation of the porosity color template can be constructed by masking out the shale lithology as determined hereinbefore, or other lithology, and applying the porosity shading only to the sands or other desired lithology. For instance, in section or slice 44 shown in FIG. 5B, the porosity of sands 32, 36, and 38 are shown. Sand 32 includes a medium porosity portion and a high porosity portion 46. It will be noted that the high porosity portion 46 in slice 44 corresponds to gas zone 38 of slice 48. Accordingly, the present invention indicates gas and high porosity for what appears may be a significant pay zone. While color template arrow 18 has only three basic colors relating to the corresponding three types of crosshatching, it would be possible to utilize a range of colors as indicated in color bar 50. For instance, a different shade of each of three colors might be utilized for the different porosities indicated numerically on color bar 50. The porosity values from color bar 50 may be calibrated into relatively precise values using known data or using techniques from U.S. Pat. No. 6,681,185, also by one of the present inventors, which is incorporated herein by reference.

As well, information may be associated with the plotted AVO points within a computer program, such as the porosity, geopressures, and the like which may be determined by the inventor's aforementioned patent or other means. This information may be included with the AVO data points for use in graphing using other dimensions, color variations, markers, or the like, in combination with those discussed hereinbefore.

The invention may be applied to information extracted from any variety of gathers from seismic data including, but not limited to, common-midpoint, common data point, shot domain, receiver domain, and/or other conceivable types of gathers. The seismic data may or may not have been migrated and may typically be represented in time or depth.

Accordingly, the foregoing disclosure and description of the invention is illustrative and explanatory thereof, and it will appreciated by those skilled in the art, that various changes in the ordering of steps, ranges, and/or attributes and parameters, as well as in the details of the illustrations or combinations of features of the method of seismic analysis may be made without departing from the spirit of the invention.

What is claimed is:

1. A method for analyzing seismic data to determine properties of subsurface formations, comprising:
    obtaining seismic data produced in response to acoustic signals transmitted through the earth;
    utilizing gathers from said seismic data for producing AVO information comprising a plurality of AVO data points;
    determining a reference point for said plurality of AVO data points, each of said AVO data points being related to an x, y, z position, said x, y, z position describing a physical location within a subsurface formation;
    utilizing a distance between said reference point and one or more of said AVO data points to classify said one or more of said AVO data points with respect to at least one of lithology or fluids or porosity; and
    determining at least one physical property at said x, y, z position of said subsurface formation from said step of utilizing said distance with respect to said reference point to classify one or more of said AVO data.

2. The method of claim 1, further comprising portraying differentiation of at least one of lithology or fluids or porosity or AVO types with respect to said x, y, z position associated with said AVO points.

3. The method of claim 1, wherein said reference point is positioned centrally with respect to a selected cluster of said plurality of AVO points.

4. The method of claim 1, further comprising utilizing an angle of said one or more AVO data points with respect to said reference point in conjunction with said distance for said classifying of said one or more AVO data points with respect to at least one of lithology or fluids or porosity or AVO types.

5. The method of claim 1, further comprising determining an angle from said reference point wherein said distance along a direction of said angle is substantially correlated with a continuous change of porosity.

6. The method of claim 5, further comprising classifying one or more of said AVO points with respect to porosity.

7. The method of claim 6, further comprising determining a normalizing factor for said distance by utilizing a shape of a selected cluster of said AVO points.

8. The method of claim 1, further comprising normalizing said distance of each of said plurality of AVO points prior to said step of utilizing said distance with respect to said reference point to classify one or more of said AVO data points with respect to at least one of lithology or fluids or porosity.

9. The method of claim 1, further comprising designating a cluster of points around said reference point as a selected lithology and designating AVO points outside of said cluster of points as being not said selected lithology.

10. A method for analyzing seismic data to determine properties of subsurface formations, comprising:
    obtaining seismic data produced in response to acoustic signals transmitted through an earth surface;
    utilizing gathers from said seismic data for producing AVO information comprising a plurality of AVO data points, said AVO data points being spaced apart from each other with a first respective spacing between each of said plurality of AVO data points, each of said AVO data points being associated with a physical location within a subsurface formation;
    determining a normalizing factor related to a shape of a selected cluster of AVO data points whereby when said normalizing factor is applied to said plurality of AVO data points then at least some of said AVO data points are moved in relationship to other AVO data points to a second respective spacing between each of said plurality of AVO data points and said shape of said selected cluster of AVO data points is altered to another desired shape; and
    determining at least one physical property at said physical location within said surface formation from said step of determining said normalizing factor.

11. The method of claim 10, further comprising utilizing said normalizing factor when classifying one or more of said AVO data points with respect to at least one of lithology or fluids or porosity or AVO type and not all of said AVO data points are moved in relationship to other AVO data points.

12. The method of claim 10, further comprising determining a reference location for said plurality of AVO data points.

13. The method of claim 12, wherein said normalizing factor is applied to a distance with respect to said reference location among said AVO data points.

14. The method of claim 13, utilizing said distance after applying said normalizing factor to classify one or more of said plurality of AVO data points with respect to at least one of lithology or fluids or porosity.

15. The method of claim 14, further comprising utilizing an angle of said one or more AVO data points with respect to said reference location in conjunction with said distance for said classifying of said one or more AVO data points with respect to at least one of lithology or fluids or porosity or AVO types.

16. The method of claim 15, further comprising portraying differentiation of at least one of lithology or fluids or porosity or AVO types with respect to an x, y, z position associated with said AVO points, said x, y, z position describing said physical location within said subsurface formation.

17. The method of claim 12, wherein said normalization factor does not affect an
angle of said plurality of AVO data points with respect to said reference location.

18. The method of claim 13, further comprising determining an angle from said reference location wherein said distance along a direction of said angle is substantially correlated with a continuous change of porosity.

19. The method of claim 18, further comprising providing a cross-plot of said AVO data points such that said angle is approximately forty-five degrees from the vertical.

20. The method of claim 10, wherein said normalizing factor is determined utilizing the formula $\frac{1}{2}\sqrt{P^2+G^2}$ wherein P is a Y-intercept and G is a gradient or slope, each said AVO data point being defined by P and G.

21. The method of claim 10, further comprising designating said selected cluster as a selected lithology and designating AVO points outside of said cluster of points as being not said selected lithology.

22. A method for analyzing seismic data to determine properties of subsurface formations, comprising:
obtaining seismic data produced in response to acoustic signals transmitted through the earth;
utilizing gathers from said seismic data for producing AVO information comprising a plurality of AVO data points;
determining a reference location for said plurality of AVO data points, each of said AVO data points being related to an x, y, z reference, said x, y, z position describing a physical location within a subsurface formation;
utilizing a distance with respect to said reference location among said plurality of AVO data points and an angle with respect to said reference location for extracting an association of said plurality of AVO points with at least one of lithology or fluids or porosity or AVO type; and
determining at least one physical property at said physical position within said subsurface formations from said step of utilizing said distance with respect to said reference location among said plurality of AVO data points and said angle with respect to said reference location for extracting said association of said plurality of AVO points with at least one of lithology or fluids or porosiw or AVO type.

23. The method of claim 22, further comprising portraying said x, y, z reference with said at least one of lithology or fluids or porosity or AVO type.

24. The method of claim 22, further comprising determining an angle from said reference location wherein said distance along a direction of said angle is substantially correlated with a continuous change of porosity.

25. The method of claim 22, further comprising normalizing a cluster of AVO points around said reference location by varying said distance of said AVO points.

* * * * *